(12) United States Patent
Giduthuri et al.

(10) Patent No.: US 10,742,834 B2
(45) Date of Patent: Aug. 11, 2020

(54) BUFFER MANAGEMENT FOR PLUG-IN ARCHITECTURES IN COMPUTATION GRAPH STRUCTURES

(71) Applicant: Advanced Micro Devices, Inc., Sunnyvale, CA (US)

(72) Inventors: Radhakrishna Giduthuri, Sunnyvale, CA (US); Michael L. Schmit, Sunnyvale, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 23 days.

(21) Appl. No.: 15/663,516

(22) Filed: Jul. 28, 2017

(65) Prior Publication Data

US 2019/0037097 A1 Jan. 31, 2019

(51) Int. Cl.
*H04N 5/225* (2006.01)
*H04N 1/21* (2006.01)
*G06T 1/60* (2006.01)
*G06T 1/20* (2006.01)
*G06F 9/445* (2018.01)
*H04N 101/00* (2006.01)

(52) U.S. Cl.
CPC ........ *H04N 1/2141* (2013.01); *G06F 9/44526* (2013.01); *G06T 1/20* (2013.01); *G06T 1/60* (2013.01); *H04N 2101/00* (2013.01); *H04N 2201/0084* (2013.01); *H04N 2201/0087* (2013.01)

(58) Field of Classification Search
CPC .................................................. H04N 5/23238
See application file for complete search history.

(56) References Cited

U.S. PATENT DOCUMENTS

| | | | | |
|---|---|---|---|---|
| 10,148,875 | B1* | 12/2018 | Chen | H04N 21/637 |
| 2001/0040624 | A1* | 11/2001 | Kobayashi | H04N 5/23238 348/152 |
| 2001/0045986 | A1* | 11/2001 | Edwards | H04N 1/215 348/239 |
| 2004/0218833 | A1* | 11/2004 | Ejiri | H04N 5/23238 382/284 |
| 2007/0160311 | A1* | 7/2007 | Edwards | H04N 1/3876 382/284 |
| 2009/0219387 | A1* | 9/2009 | Marman | G08B 13/19652 348/143 |
| 2012/0249728 | A1* | 10/2012 | Kato | H04N 1/3871 348/36 |
| 2018/0157930 | A1* | 6/2018 | Rutschman | B64G 1/1021 |

* cited by examiner

*Primary Examiner* — Twyler L Haskins
*Assistant Examiner* — Dwight Alex C Tejano
(74) *Attorney, Agent, or Firm* — Volpe and Koenig, P.C.

(57) ABSTRACT

A computer vision processing device is provided which comprises memory configured to store data and a processor. The processor is configured to store captured image data in a first buffer and acquire access to the captured image data in the first buffer when the captured image data is available for processing. The processor is also configured to execute a first group of operations in a processing pipeline, each of which processes the captured image data accessed from the first buffer and return the first buffer for storing next captured image data when a last operation of the first group of operations executes.

13 Claims, 5 Drawing Sheets

US 10,742,834 B2

BUFFER MANAGEMENT FOR PLUG-IN ARCHITECTURES IN COMPUTATION GRAPH STRUCTURES

BACKGROUND

Computer vision includes the acquiring, processing and analyzing of captured images to gain a high-level understanding of the images and provide more informative or esthetically pleasing images than the original captured images. OpenVX is an open standard for cross platform acceleration of computer vision applications using a computational graph structure framework. OpenVX defines an Application Programming Interface (API) for building, verifying and coordinating graph execution, as well as for accessing memory objects.

In the OpenVX framework, captured image data is received and processed by building connected graphs of vision nodes using the captured image data. The OpenVX framework includes a library of predefined vision functions (i.e., plug-ins), which are implemented via an OpenVX user kernel API. The plug-ins yield additional features or functions to an existing program executing in a computational graph pipeline by providing output data according to predefined input data and parameters.

BRIEF DESCRIPTION OF THE DRAWINGS

A more detailed understanding can be had from the following description, given by way of example in conjunction with the accompanying drawings wherein.

DETAILED DESCRIPTION

Figure 1:
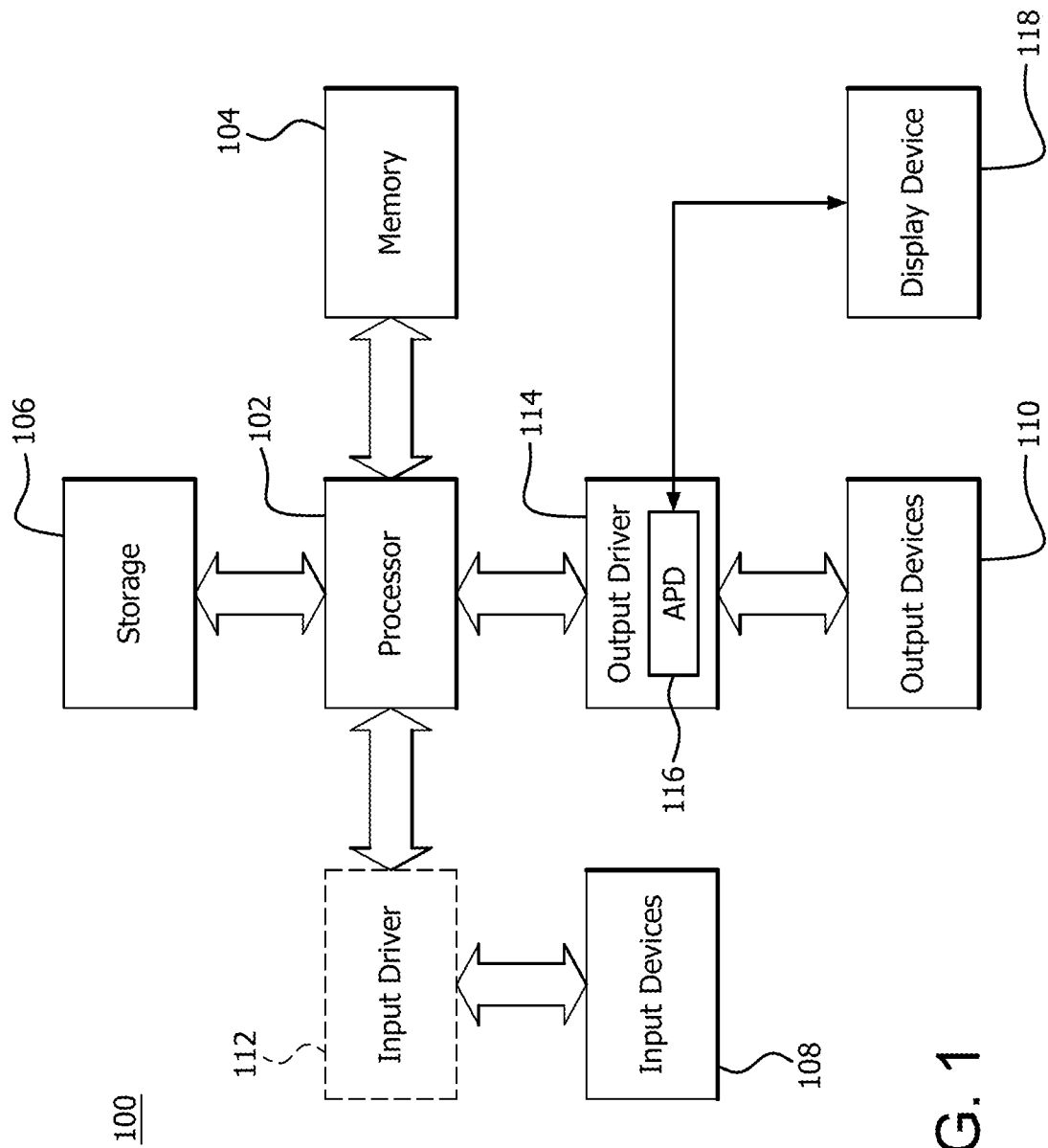
FIG. 1 is a block diagram of an example device in which one or more features of the disclosure can be implemented.

As used herein, a program includes any sequence of instructions (e.g., an application, a module (e.g., a stitching module for stitching captured image data), a kernel, a work item, a group of work items and the like) to be executed using one or more processors to perform procedures or routines (e.g., operations, computations, functions, processes and jobs). Processing of programmed instructions includes one or more of a plurality of processing stages, such as but not limited to fetching, decoding, scheduling for execution and executing the programmed instructions. As used herein, a plug-in includes programmed instructions which perform one or more functions, each of which returns a value based one or more inputs. In the OpenVX framework, a plug-in is a predefined user kernel.

Many computer vision applications are computationally expensive. For example, computer vision applications include programs (e.g., stitching modules or face detection modules) which are often executed in real time, such as the processing of a single frame within 30-40 milliseconds. Input buffers are allocated for input plug-ins, which provide data to a computer vision program executing operations in a processing pipeline. Output buffers are allocated for output plug-ins, which receive processed data from the processing pipeline.

Conventional computer vision techniques acquire each input buffer allocated for each input plug-in before execution of the processing pipeline begins and wait for each operation in the processing pipeline to finish processing before returning the input buffers to an input plug-in for storing the next captured data. Conventional techniques also wait for each operation in the pipeline to finish executing before acquiring an output buffer and wait for each portion of data to be processed in the pipeline before outputting the processed data from the output frame buffer. Each of these conventional techniques result in undesirable latency periods occurring between data input, data processing and data output.

The present application provides devices and methods of managing plug-in buffers in computation graph structure frameworks (e.g., OpenVX framework) that reduce the latency of conventional techniques incurred between data input, data processing and data output. Each plug-in allocates, monitors and manages its own buffer memory.

For input buffers, allocated to input plug-ins which provide data to a processing pipeline, the latency incurred by conventional techniques is reduced by acquiring the input buffers when the data to be provided to the pipeline is available for processing and returning the input buffers to the input plug-ins for capturing next data (e.g., next frame data) when a last operation, which processes the data stored in the input buffers, is executed.

For output buffers, allocated to output plug-ins which receive data from the pipeline, the latency incurred by conventional techniques is reduced by acquiring the output buffers when the last operation, which processes data derived from the data stored in the input buffers, is ready to be scheduled for processing and outputting processed data from the output buffers when the processed data is stored in the output buffers.

A computer vision processing device is provided which includes memory configured to store data and a processor. The processor is configured to store captured image data in a first buffer and acquire access to the captured image data in the first buffer when the captured image data is available for processing. The processor is also configured to execute a first group of operations in a processing pipeline, each of which processes the captured image data accessed from the first buffer and return the first buffer for storing next captured image data when a last operation of the first group of operations executes.

A computer vision processing device is provided which includes memory configured to store data and a processor configured to execute a second group of operations in a processing pipeline, each of which processes data derived from captured image data accessed from a first buffer. The processor is also configured to acquire access to a second buffer when a last operation of the second group of operations is available to be scheduled for processing in the processing pipeline and store, in the second buffer, a plurality of portions of processed data from the processing pipeline. The processor is further configured to output each portion of processed data from the second buffer when each portion of processed data is stored in the second buffer.

A computer vision acceleration method is provided which includes storing, by a processor, captured image data in a first buffer and acquiring, via the processor, access to the captured image data in the first buffer when the captured image data is available for processing. The method also includes executing, via the processor, a first group of operations in a processing pipeline, each of which processes the captured image data accessed from the first buffer. The method further includes returning, via the processor, the first buffer for storing next captured image data when a last operation of the first group of operations executes.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes one or more processors, such as a central processing unit (CPU), a graphics processing unit (GPU), or another type of compute accelerator, a CPU and GPU located on the same die, or one or more processor cores, wherein each processor core can be a CPU or a GPU or another type of accelerator. Multiple processors are, for example, included on a single board or multiple boards. Processor on one or more boards. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, one or more image capture devices (e.g., cameras), a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, one or more serial digital interface (SDI) cards, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 include, for example, one or more video capture devices, such as a video capture card (e.g., an SDI card). As shown in FIG. 1, the input driver 112 and the output driver 114 are separate driver devices. Alternatively, the input driver 112 and the output driver 114 are integrated as a single device (e.g., an SDI card), which receives captured image data and provides processed image data (e.g., panoramic stitched image data) that is stored (e.g., in storage 106), displayed (e.g., via display device 118) or transmitted (e.g., via a wireless network).

It is noted that the input driver 112 and the output driver 114 are optional components, and that the device 100 will operate in the same manner if the input driver 112 and the output driver 114 are not present. In an example, as shown in FIG. 1, the output driver 114 includes an accelerated processing device ("APD") 116 which is coupled to the display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
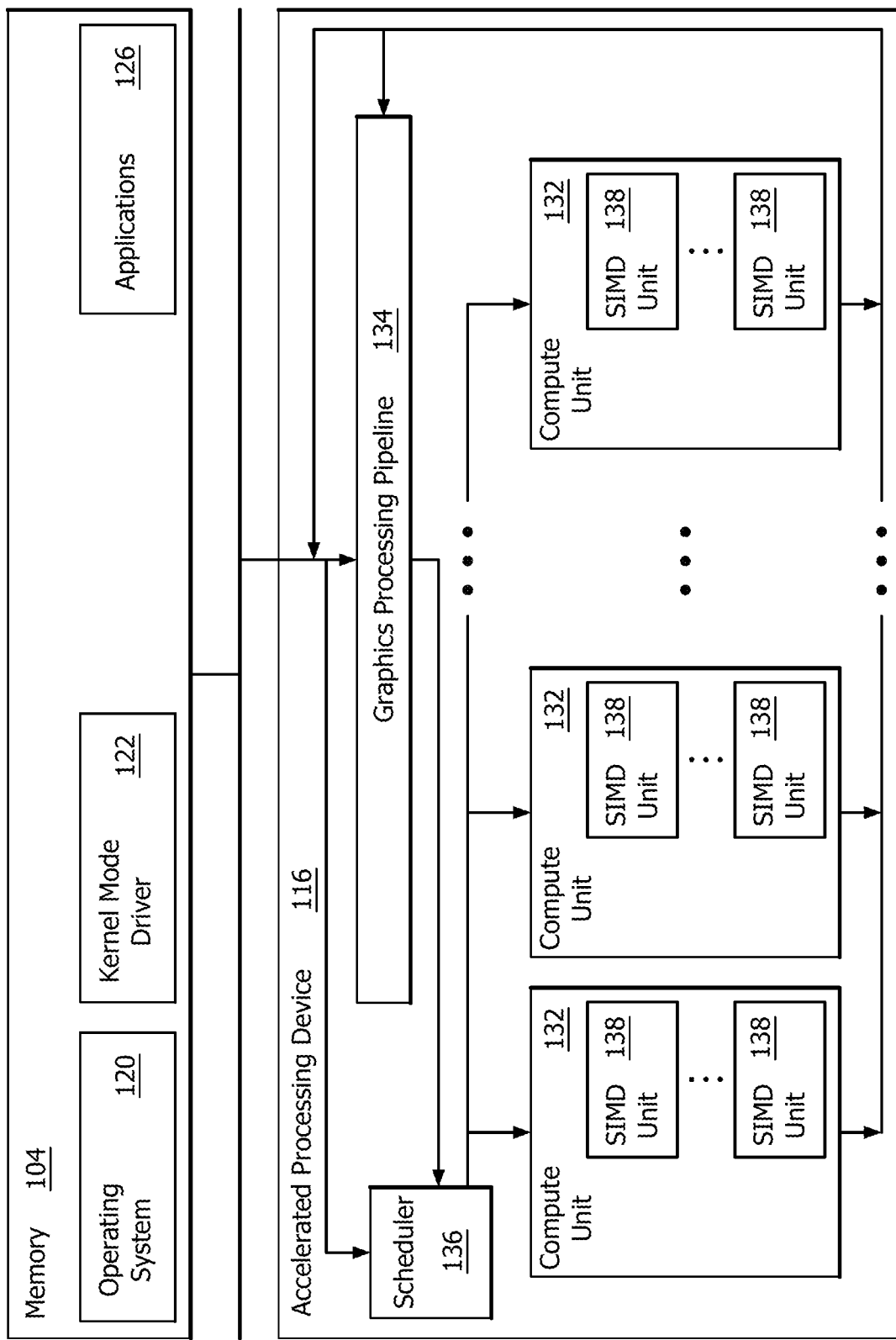
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122 (e.g., plug-ins shown in FIG. 4 or other plugins having defined abstracted functions) and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
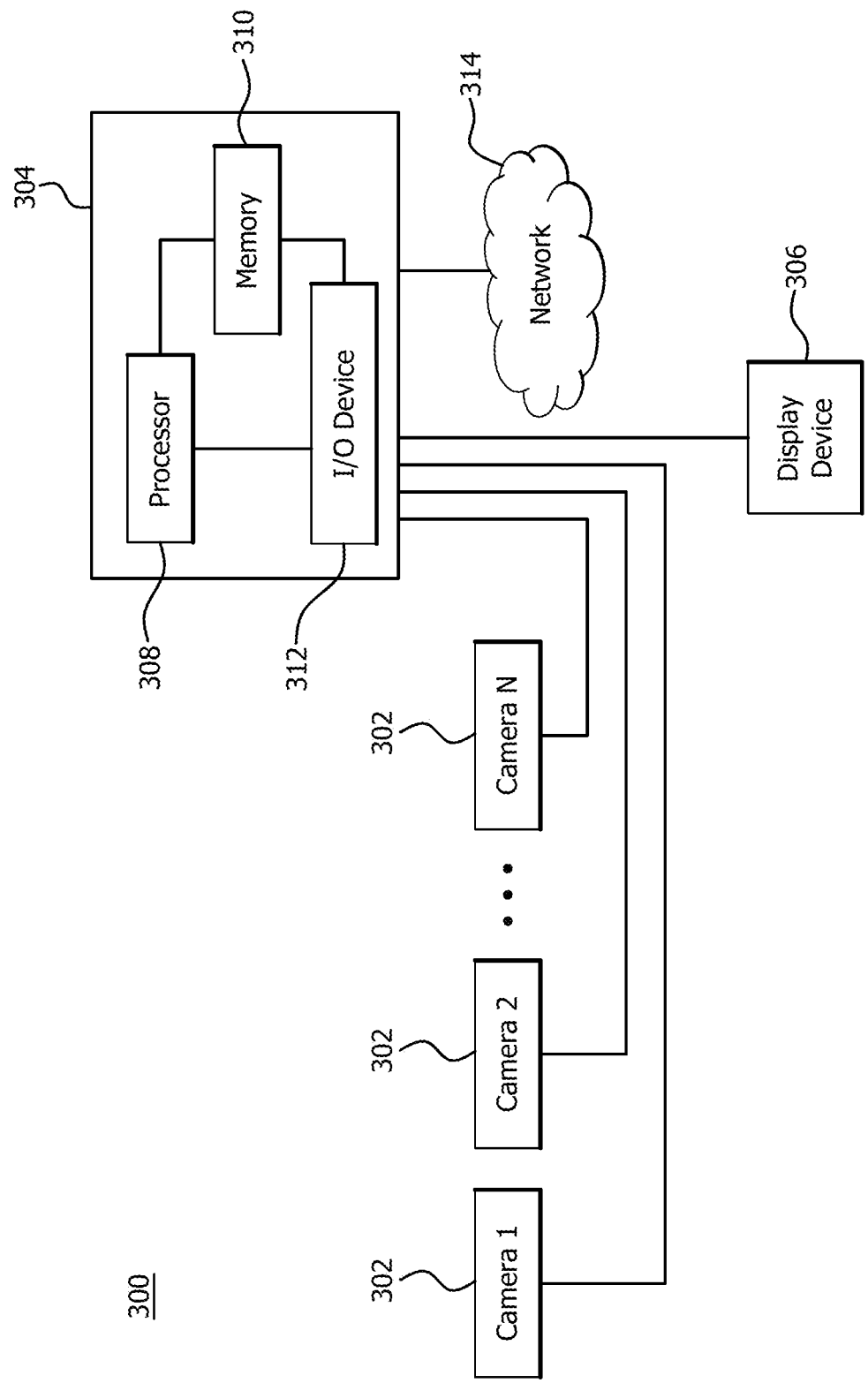
FIG. 3 is a block diagram illustrating an exemplary system in which one or more features of the disclosure can be implemented.

FIG. 3 is a block diagram illustrating an exemplary system 300 in which one or more features of the disclosure can be implemented. As shown in FIG. 3, the system 300 includes a plurality of cameras 302, a computing device 304 and a display device 306. The computing device 304 includes processor 308 (e.g., APD 116 or processor 102), memory 310 and input/output (I/O) device 312.

Computing device 304 includes, for example, a computer, a gaming device, a handheld device, a set-top box, a television, a mobile phone, and a tablet computer.

I/O device 312 includes, for example, a video capture card (e.g., a standard definition (SD) SDI card, a high definition (HD) SDI card, a dual SD/HD SDI), and a high-definition multimedia interface (HDMI) card), which operates as both an input device by receiving captured image data from each of the cameras 302 for processing by processor 308 and as an output device by providing the processed image data to display device 306, to a storage (e.g., storage 106), or to network 314 (e.g., wired or wireless network). Processor 308 includes various processing capabilities, such as for example, scheduling, executing, reading, writing, loading and storing.

Figure 4:
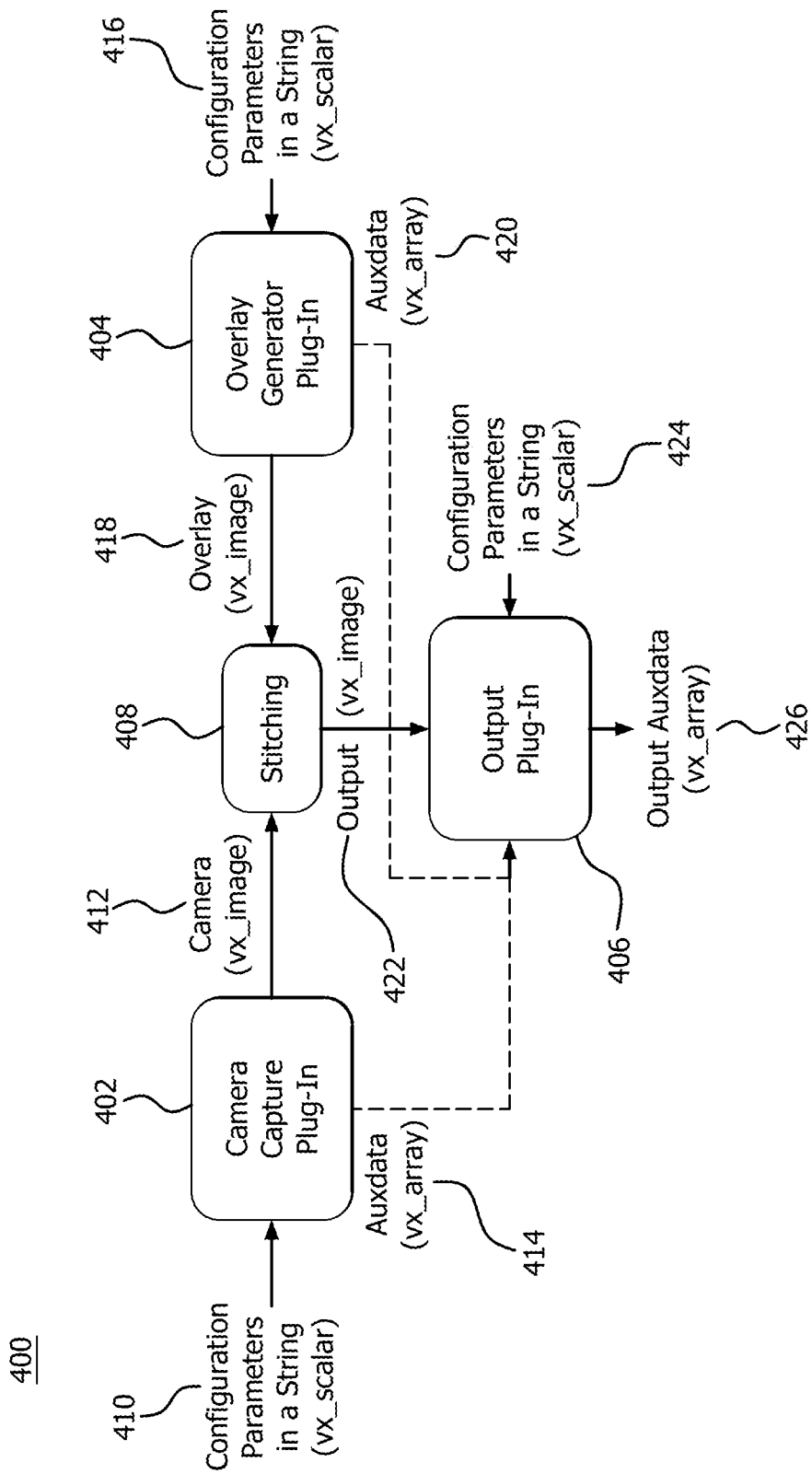
FIG. 4 is a diagram illustrating an example implementation of plug-ins and a computer vision program as part of a computer vision framework.

FIG. 4 is a diagram 400 illustrating an example implementation of plug-ins 402, 404 and 406 and Stitching module 408 as part of a computer vision framework, such as an OpenVX framework. The plug-ins 402, 404 and 406 are, for example, implemented via an OpenVX user kernel API and yield additional features or functions to Stitching module 408. The plug-ins 402, 404 and 406 provide one or more defined (e.g., user defined or vendor defined) types of output data when one or more defined input types are received.

Camera Capture Plug-in 402 and Overlay Generator Plug-in 404, to which each is allocated a first set (i.e., one or more) of buffers (i.e., input buffers), are input plug-ins that provide input image data (camera vx_image and overlay vx_image, respectively) to Stitching module 408. Plug-in 406, to which a second set of buffers (i.e., output buffers) is allocated, is an output plug-in that receives processed image data (i.e., output vx_image) from Stitching module 408.

Stitching module 408 shown in FIG. 4 is a non-limiting example of computer vision module executing in a computational graph pipeline. Examples of other computer vision modules include, without limitation, modules for performing face detection, pedestrian detection, road sign detection, and object classification (e.g., a road, a sign, a building, a car, a person) in a scene. In addition, plug-ins 402, 404 and 406 shown in FIG. 4 are non-limiting examples of plug-ins implemented as part of a computer vision framework, such as the OpenVX framework. Further, the number of plug-ins shown in FIG. 4, which provide data to and receive data from the computer vision Stitching module 408, is also exemplary.

As shown in FIG. 4, Camera Capture Plug-in 402 receives configuration parameters 410 and outputs captured image data 412 and, optionally, auxiliary data (e.g., audio data) 414. Overlay Generator Plug-in 404 receives configuration parameters 416 and outputs overlay image data 418 (e.g., image to be overlaid onto a captured image) and, optionally, auxiliary data 420. A computer vision program (i.e., Stitching module 408 which includes programmed instructions to execute operations for stitching images) receives the captured image data 412 from Camera Capture Plug-in 402 and overlaid image data 418 from Overlay Generator Plug-in 404 and outputs stitched image data 422. Output Plug-in 406 receives the stitched image data 422 from Stitching module 408, configuration parameters 424 and, optionally, auxiliary data 414 and 420 and outputs auxiliary data 426.

Output Plug-in 406 is, for example, an output display plug-in which provides data (e.g., image data) for display according to received input data (e.g., stitched image data from Stitching module 408). For example, Output Plug-in 406 provides image data: to a display device (e.g., display device 118) for display; to memory or a storage device (e.g., storage 106) to be stored and later displayed, or to a network (e.g., via a wired or wireless network), such as network 314, to be transmitted for storage and/or display remote from computing device 304.

Referring to both FIG. 3 and FIG. 4, for each of the cameras 302, Camera Capture Plug-in 402 allocates one or more input buffers (e.g., in memory 310) for the image data 412, corresponding to images captured from a corresponding camera 302, via I/O device 312, such as a video capture card. The captured image data 412 is received (e.g., via "vx_image" object) by Stitching module 408. The overlay image data, corresponding to images overlaid on the captured images, is also received (e.g., via "vx_image" object)

by Stitching module 408. The image data 412 and 418 is then stitched, using processor 308, and provided as stitched image data 422. The stitched image data 426 (e.g., panoramic stitched image data) is provided for display (e.g., to display device 118), stored (e.g., in storage 106), or transmitted (e.g., via a wired or wireless network).

Figure 5:
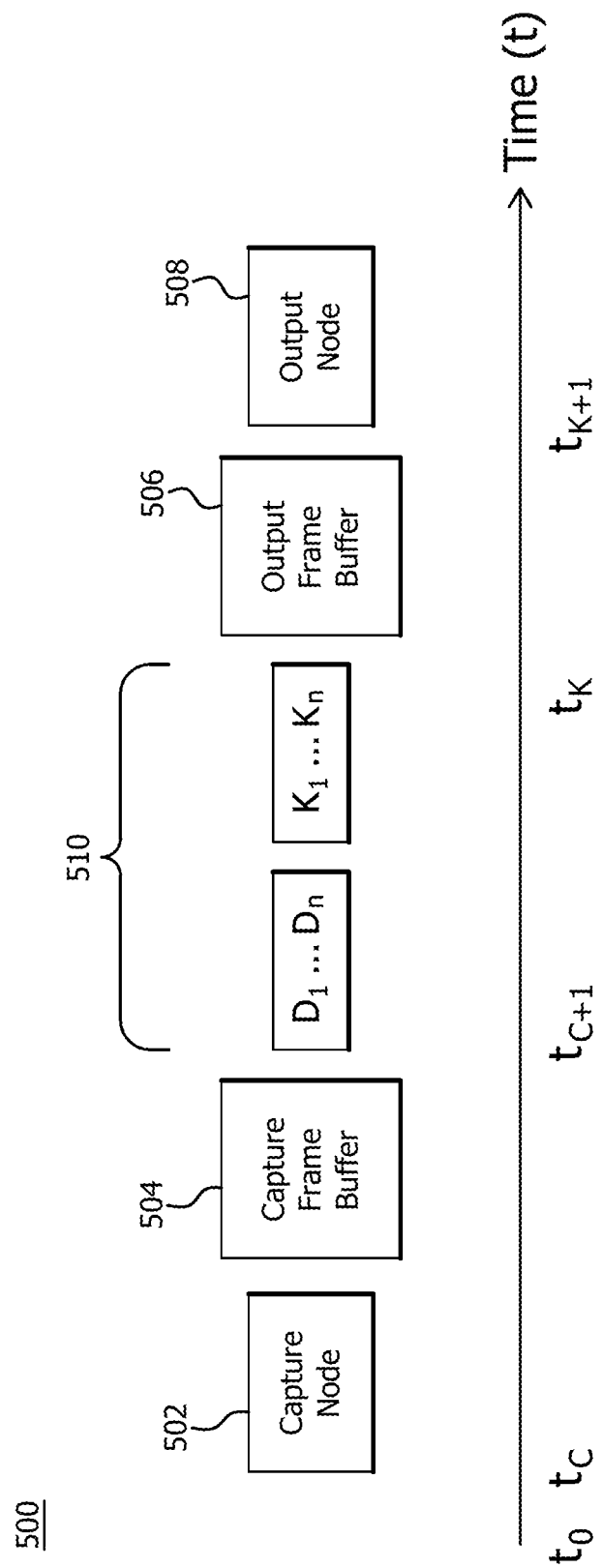
FIG. 5 is a diagram illustrating exemplary stages of implementing computer vision plug-ins for managing buffers in a computation graph structure framework.

FIG. 5 is a timing diagram 500 illustrating exemplary stages of implementing plug-ins for managing buffers in a computation graph structure framework. By way of example and for explanation purposes, FIG. 5 illustrates a Capture Node 502 (e.g., Camera Capture Plug-in Node), a Capture Frame Buffer 504 (i.e., an input buffer), an Output Frame Buffer 506 and Output Node 508 (e.g., Output Plug-in Node). Further, processing pipeline 510 is a stitching pipeline for implementing the exemplary Stitching module 408 shown in FIG. 4. Examples of other computer vision processing pipelines include, without limitation, pipelines for processing data for face detection, pedestrian detection, road sign detection, and object classification (e.g., a road, a sign, a building, a car, a person) in a scene.

Image data is captured by cameras 1 to N in FIG. 3 and is received by Capture Node 402 and stored in Capture Frame Buffer 504, which is pre-allocated to Capture Node 502. Some time after time $t_0$, at time $t_C$ in FIG. 5, the Capture Frame Buffer 504 is acquired. That is, access to the image data stored in the Capture Frame Buffer 504 is acquired for processing in the processing pipeline 510. Capture Frame Buffer 504 is acquired at time $t_C$ when the captured image data is determined (e.g., by processor 308) as available for processing in the processing pipeline 510. The captured image data is available for processing when the storing of the captured image data in the Capture Frame Buffer 504 is completed. When access to the stored captured image data is acquired, the stored captured image data is processed (e.g., by processor 308 via the pointer) in the processing pipeline 510.

One or more input buffers (i.e., input buffer portions) are pre-allocated to an input plug-in (i.e., input node, such as Capture Node 502). In the case of dual buffering, for example, first and second input buffer portions (i.e., first buffer portion and second buffer portion) are pre-allocated to Capture Node 502 and placed in a Capture Node queue. While processor 308 is storing the captured image data to the first buffer portion, the processor 308 queues the second buffer portion for processing. When the storing of the captured image data in the first buffer portion is completed, the image data in the first buffer portion is determined by processor 308 as available for processing and the processor 308 injects the pointer, which points to the address in the first buffer portion, into the second buffer portion. Access to the captured image data in the second buffer portion is then acquired for processing (via the pointer) and the accessed image data is processed in the processing pipeline 510, beginning at time $t_{C+1}$. While the second buffer portion is being accessed to process the image data in the processing pipeline 510, the next image data is stored in the first buffer portion.

The processing pipeline 510 includes a plurality of operations, including operations $D_1$ to $D_n$ and operations $K_1$ to $K_n$. Operations $D_1$ to $D_n$ and operations $K_1$ to $K_n$ include any number of operations, each of which are performed in parallel with any other number of operations, or alternatively, sequential to other operations. Operations $D_1$ to $D_n$ include operations which directly process the data stored in Capture Frame Buffer 504.

Capture Frame Buffer 504, allocated to Camera Capture plug-in 402, is returned to Capture Node 502 for storing the next captured image data (e.g., next frame of data) when the last operation $D_n$, which directly uses the data stored in the Capture Frame Buffer 504, is executed. For example, in the case of dual buffering, the second buffer is returned to the Capture Node 502 for storing the next frame of image data when the last operation $D_n$ is executed.

Operations $K_1$ to $K_n$ include operations which process data derived from the data stored in frame buffer 504. Operation $K_n$ is the last executing operation which processes data derived from the captured image data stored in frame buffer 504. Before processor 308 schedules operation $K_n$ at time $t_K$, processor 308 requests, from Output Node 508, an idle buffer, from one of a plurality of output buffers pre-allocated to Output Node 508, for storing processed data to be output (e.g., output for display). Processor 308 then acquires access to the idle buffer (e.g., access to a first idle buffer portion or a second idle buffer portion in the case of dual buffering) and sets the idle buffer as Output Frame Buffer 506 using the pointer.

When Output Frame Buffer 506 is acquired (i.e., acquire access to store the processed data in Output Frame Buffer 506), the processor 308 schedules operation $K_n$ for processing. The processed data output from operation $K_n$ is then stored in the acquired Output Frame Buffer 506 at the address indicated by the pointer. After $K_n$ is executed, the processor determines there is valid processed data to be output (e.g., for display). When the valid processed data is determined as available (i.e., stored in Output Frame Buffer 506), the processor 308 outputs the stored processed data from the Output Frame Buffer 506 at time $t_{K+1}$. The processed data is then provided, for example, for display to a display device (e.g., display device 306), to a storage (e.g., storage 106), or to network 314 (e.g., wired or wireless network). That is, a portion of the processed data is output from the Output Frame Buffer 506 when the portion of data is stored in the Output Frame Buffer 506.

As described above, conventional computer vision processing techniques incur latency by acquiring input buffers, allocated for each plug-in providing data to an executing computer vision program before execution of each operation in the processing pipeline and waiting for each operation in the processing pipeline to finish executing before returning an input buffer to an input plug-in. Conventional computer vision processing techniques also incur latency by waiting for each operation to finish executing in the pipeline before acquiring an output buffer allocated to an output plug-in and waiting for each portion of data to be executed in the pipeline before outputting data from an output buffer.

The methods and devices described herein reduce the latency incurred by conventional computer vision processing techniques by acquiring a first buffer (e.g., Capture Frame Buffer 504) allocated to an input plug-in, which provides input data (e.g., captured frame data) to an executing program (e.g., Stitching module 408) for processing in the processing pipeline (e.g., pipeline 510), when the data in the first buffer becomes available (i.e., storing of the data is completed) for processing in the processing pipeline 510. Latency incurred by conventional techniques is also reduced by returning an input buffer (e.g., Capture Frame Buffer 504) to the input plug-in for the capturing of the next frame when the last operation (e.g., $D_N$) which uses the data stored in the input buffer is executed rather than waiting for each operation in the processing pipeline to finish executing.

Latency of conventional techniques is also reduced by acquiring an output buffer (e.g., Output Frame Buffer 506) when the last operation (e.g., $K_n$) in which data, derived from the data stored in an input buffer (e.g., Capture Frame Buffer 504), is ready to be scheduled for processing rather than waiting for each operation to finish executing. The latency of conventional techniques is further reduced by outputting data from an output buffer (e.g., Output Frame Buffer 506) when the data output from the last operation $K_n$ becomes available (i.e., stored in the output buffer) rather than waiting for each portion of data to finish executing.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computer vision processing device comprising:
   memory configured to store data; and
   a processor configured to:
   store captured image data, for a plurality of images, in a first buffer;
   acquire access to the captured image data in the first buffer when the storing of the captured image data in the first buffer is completed;
   generate combined image data from the plurality of images by executing a first group of operations in a processing pipeline, each of which processes the captured image data accessed from the first buffer; and
   return the first buffer for storing next captured image data when a last operation of the first group of operations executes to generate the combined image data,
   wherein each operation, of the first group of operations, directly processes the captured image data accessed from the first buffer.

2. The processing device according to claim 1, wherein the first buffer is an input buffer allocated to a camera capture plug-in.

3. The computer vision processing device according to claim 1, wherein the processor is further configured to:
   execute a second group of operations in the processing pipeline, each of which processes data derived from the captured image data accessed from the first buffer;
   acquire access to a second buffer when a last operation of the second group of operations is available to be scheduled for processing in the processing pipeline;
   store, in the second buffer, a plurality of portions of processed data from the processing pipeline; and
   output each portion of processed data from the second buffer when each portion of processed data is stored in the second buffer.

4. The processing device according to claim 3, wherein the second buffer is an output display buffer allocated to an output display plug-in.

5. The processing device according to claim 3, wherein the first buffer and the second buffers are allocated to plug-ins configured to perform one or more functions, each of the one or more functions returning a value based one or more inputs.

6. The processing device according to claim 5, wherein the plug-ins are predefined user kernels implemented in an OpenVX standard.

7. A computer vision acceleration method comprising:
   storing, by a processor, captured image data, for a plurality of images, in a first buffer;
   acquiring, via the processor, access to the captured image data in the first buffer when the storing of the captured image data in the first buffer is completed;
   generating combined image data from the plurality of images by executing, via the processor, a first group of operations in a processing pipeline, each of which processes the captured image data accessed from the first buffer; and
   returning, via the processor, the first buffer for storing next captured image data when a last operation of the first group of operations executes to generate the combined image data,
   wherein each operation, of the first group of operations, directly processes the captured image data accessed from the first buffer.

8. The method according to claim 7, wherein the first buffer is an input frame data buffer allocated to a camera capture plug-in.

9. The method according to claim 7, further comprising:
   executing, via the processor, a second group of operations in the processing pipeline, each of which processes data derived from the captured image data accessed from the first buffer;
   acquiring, via the processor, access to a second buffer when a last operation of the second group of operations is available to be scheduled for processing in the processing pipeline;
   storing, via the processor, in the second buffer, a plurality of portions of processed data from the processing pipeline; and
   outputting, via the processor, each portion of processed data from the second buffer when each portion of processed data is stored in the second buffer.

10. The method according to claim 9, wherein the second buffer is an output display buffer allocated to an output display plug-in.

11. The method according to claim 9, wherein the first buffer and the second buffer are allocated to plug-ins configured to perform one or more functions, each of the one or more functions returning a value based one or more inputs.

12. The method according to claim 11, wherein the plug-ins are predefined user kernels implemented in an OpenVX standard.

13. A computer vision processing device comprising:
memory configured to store data; and
a processor configured to:
- store captured image data in a first buffer portion of a first buffer using a pointer indicating an address in the first buffer portion;
- when the storing of the captured image data in the first buffer is completed, inject the pointer into a second buffer portion of the first buffer and acquire access to the captured image data in the second buffer portion of the first buffer;
- execute a first group of operations in a processing pipeline, each of which processes the captured image data in the second buffer portion; and
- return the first buffer portion and store next captured image data in the first buffer portion while the captured image data in the second buffer portion is being processed.

\* \* \* \* \*